Sept. 20, 1932.   I. H. JONES   1,878,584
WINDSHIELD HOLDING DEVICE
Filed Nov. 3, 1930   2 Sheets-Sheet 2
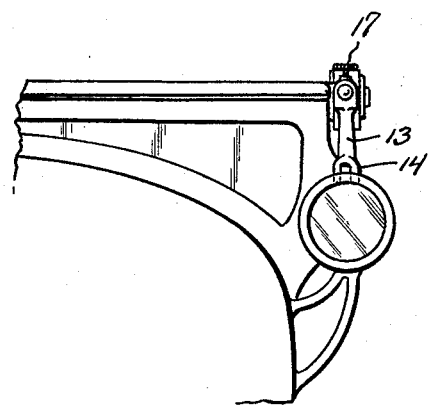
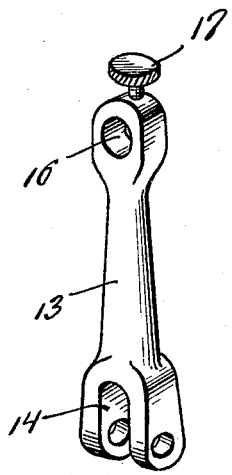
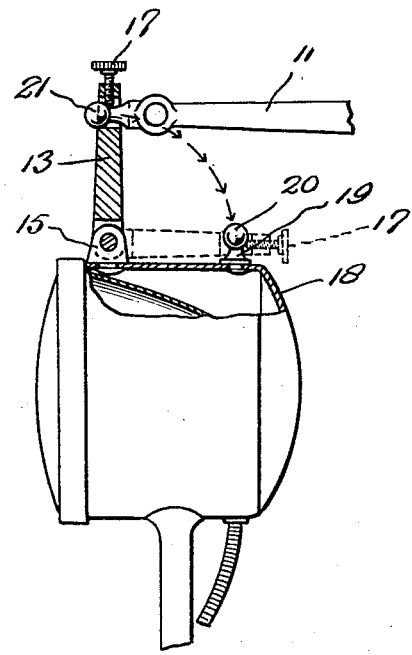
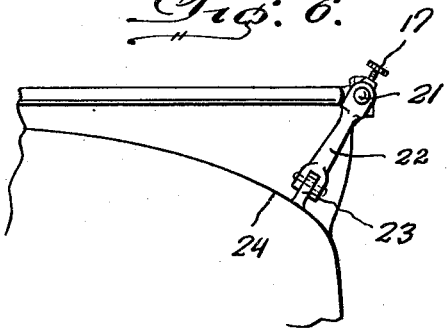
Ivan H. Jones,
INVENTOR.
BY J. Stanley Burch
ATTORNEY.

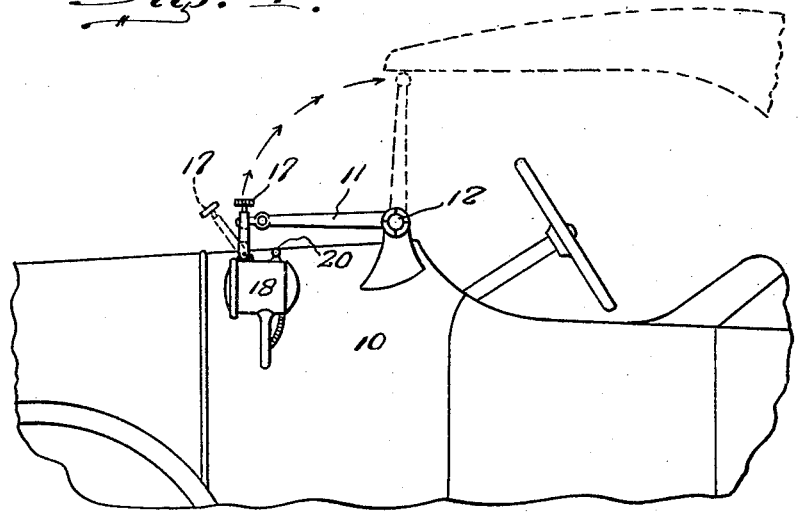
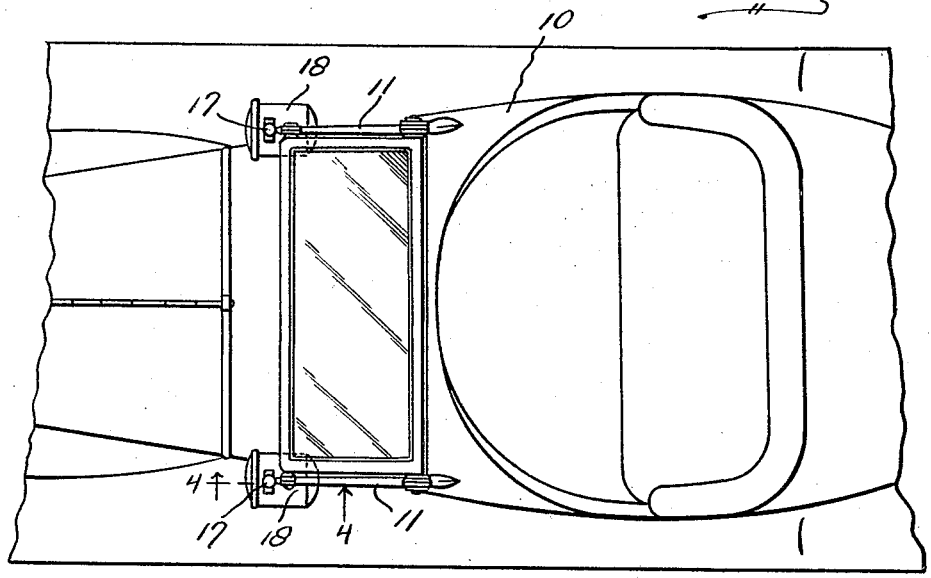

Patented Sept. 20, 1932

1,878,584

UNITED STATES PATENT OFFICE

IVAN H. JONES, OF GREAT FALLS, MONTANA

WINDSHIELD HOLDING DEVICE

Application filed November 3, 1930. Serial No. 493,166.

Many motor vehicles are provided with windshields mounted to be swung outwardly and downwardly to a horizontal open position, and frequently, they are abruptly raised to an upright position by the pressure of the wind, causing damage to the windshield, and sometimes breaking of the glass thereof.

It is therefore the primary object of the present invention to provide a novel construction of means for holding the windshield immovable in its horizontal open position.

In carrying out the invention I comprehend the provision of means for this purpose, with which the windshield can be quickly and conveniently associated, or separated therefrom as the occasion may require.

Another object of importance resides in the provision of a windshield support of the above-mentioned character, and which support is mounted upon the vehicle in a manner whereby it can be arranged in an out-of-the-way position when the windshield is closed.

Other objects and advantages of the invention will be readily understood when the following detailed description is read in connection with the accompanying drawings, the invention residing in the construction, combination and arrangement of parts as claimed.

In the drawings forming part of this application like numerals of reference indicate similar parts in the several views and wherein:

Figure 1 is a fragmentary side elevation of a motor vehicle showing the windshield in its closed position by dotted lines, and the manner in which it is held in its open horizontal position.

Figure 2 is a top plan view of Figure 1.

Figure 3 is a fragmentary edge elevation showing the windshield in its open position.

Figure 4 is a fragmentary view partly in section showing how the windshield is associated with its supporting means in accordance with one embodiment of the invention, and also illustrating the supporting means folded to an out-of-the-way position when not in use.

Figure 5 is a perspective view of one of the supporting arms.

Figure 6 is a fragmentary view showing a slightly modified form of the invention, in that the windshield support is mounted upon the cowl of the vehicle, in counterdistinction to the arrangement illustrated in Figure 4.

Referring to the drawings in detail, and more particularly to Figures 1 to 5 inclusive, 10 indicates generally a motor operated vehicle, the windshield for which is indicated at 11, and pivotally mounted as at 12, so that the windshield can be swung from its vertical closed position as illustrated by dotted lines in Figure 1, to a horizontal open position as illustrated by full lines in Figure 1.

As hereinabove stated, the present invention contemplates a novel construction of means for holding the windshield immovable when occupying a horizontal open position, and in accordance with the specific embodiment of the invention herein illustrated, this means essentially embodies a pair of supporting arms 13 of the character clearly illustrated in Figure 5. Each arm is bifurcated at one end as at 14, and this end is pivotally mounted upon a suitable lug 15, while the arm 13 adjacent its opposite end is preferably formed with a large opening 16 and a thumb screw 17. These supporting arms are adapted to engage and support the windshield 11 immovable with relation to the body of the vehicle, when the windshield is swung to its horizontal open position, and the arms are constructed to permit of their quick and convenient association with the windshield, or their separation therefrom as the occasion may require. The arms of course are carried by the vehicle, and may be mounted on any appropriate part thereof, although in the preferred embodiment of the invention I have shown these arms as mounted upon the head lamp 18. Consequently each head lamp is provided with one of the lugs 15 which pivotally support one of the arms 13, while also carried by each head lamp is a headed element 19, the head 20 of which being preferably of spherical contour. The element 19 is located upon the lamp in such position to cooperate with the adjacent arm 13 and holding the latter immovable in an out-of-the-way position. In other words, each arm 13 can be arranged in a horizontal position when not in use as illustrated by dotted lines in Figure 4, and in which position the spherical head 20 of the element 19 is received by the opening 16 of said arm, after which the thumb screw 17 can be tightened against the head 20 of said element and thereby hold the arm in its given position.

The windshield 11 may of course be held in its elevated or closed position in any suitable manner, but the windshield is preferably provided with ball-like extensions 21 which are adapted to be received by the opening 16 of the arms 13, when the latter are moved to vertical positions for use.

In practice, the arms 13 normally occupy the positions illustrated by dotted lines in Figure 4, with the windshield 11 in its upright closed position. When it is desired to open the windshield, the arms 13 are elevated and arranged as an inclination as shown by dotted lines in Figure 1, out of the path of the downward swinging movement of the windshield 11. After the latter has been arranged in its horizontal open position, the arms 13 are then moved in the direction of the windshield, whereupon the ball-like extensions 21 are received by the openings 16 of said arm, and the thumb screws 17 are subsequently tightened against said extensions, to hold the windshield immovable in its open position, until such times as it is desired to elevate the latter to its closed position. For this purpose, it is of course only necessary to reverse the operation with a view of separating the arms 13 from the ball-like extensions 21, whereupon the windshield 11 can be quickly and conveniently elevated to its closed position.

In Figure 6 I have illustrated a slightly modified form of the invention, wherein the windshield supporting arm 22 is pivotally mounted upon a lug 23 secured to the cowl 24 of the vehicle, in counter-distinction to the head lamp 18 hereinabove referred to. Otherwise, the arm 22 is constructed and used in conjunction with the windshield in the same manner as described with regard to the arms 13.

While it is believed that from the foregoing description the nature and advantages of the invention will be readily understood, I desire to have it known that I do not limit myself to what is herein illustrated and described, and that such changes may be resorted to when desired as fall within the scope of what is claimed.

What I claim as new is:

1. The combination with a motor vehicle windshield mounted to assume a horizontal open position, of a pair of normally horizontally disposed apertured arms pivotally mounted on the vehicle for movement independently of the windshield, and adapted to assume vertical positions to receive and support the standards of the windshield in its open position, a thumb screw carried by each arm for holding the latter and windshield fixed relatively when associated, and means for holding said arms immovable in their normal position, including said thumb screw.

2. A windshield support of the character described comprising a pair of normally horizontally disposed arms pivotally mounted upon the vehicle for movement independently of the vehicle and adapted to be arranged vertically for use, said arms having openings to receive the ends of the windshield standards and support the windshield in a horizontal open position, a thumb screw carried by each arm for holding the latter and the windshield fixed relatively when associated, means for holding said arms immovable in their normal horizontal position, including said thumb screw and a projection carried by the vehicle and received by the opening of the adjacent arm.

3. The combination with a motor vehicle having a windshield mounted to assume a horizontal open position, of a pair of arms normally disposed horizontally and pivotally mounted on the vehicle for movement independently of the windshield, projections rising from said vehicle, said arms having openings to normally receive said projections, and adapted to receive the ends of the windshield standards when the arms are arranged vertically and the windshield horizontally, and thumb screws carried by said arms to engage said projections and windshield standards in one or the other position of said arms.

In testimony whereof I affix my signature.

IVAN H. JONES.